Figure 1:
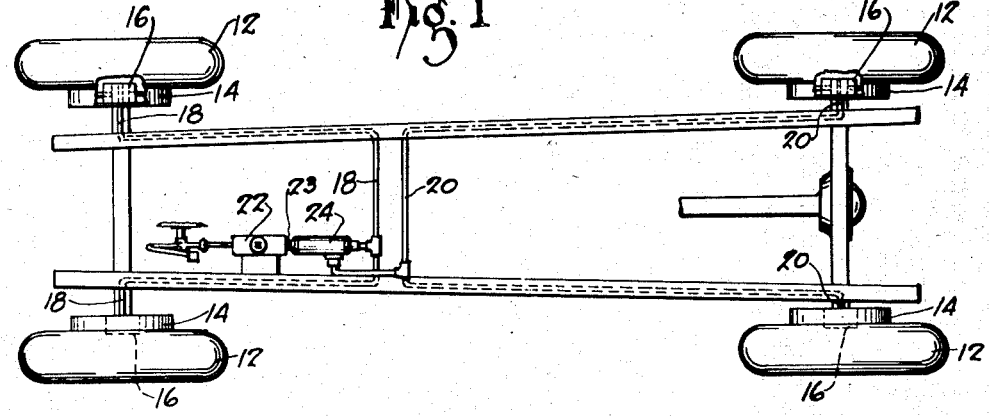

Feb. 6, 1940.   G. P. ROBERTS   2,189,224
BRAKE
Filed July 14, 1936

INVENTOR.
GLYN PIERCE ROBERTS
BY Jerome R. Cox
ATTORNEY.

Patented Feb. 6, 1940

2,189,224

UNITED STATES PATENT OFFICE 2,189,224

BRAKE

Glyn Pierce Roberts, Birmingham, England, assignor to Bendix Products Corporation, South Bend, Ind., a corporation of Indiana Application July 14, 1936, Serial No. 90,554
In Great Britain October 7, 1935

2 Claims. (Cl. 188—152)

This invention relates to fluid operated brakes for vehicles, of the type in which pressure is applied through a pedal or lever to a piston or master cylinder containing fluid and the master cylinder is connected by pipe lines to cylinders, in or adjacent to the brake drums, the cylinders containing pistons by which the brakes are applied.

With such a brake system on a four wheel vehicle, the braking effort applied to all four wheels is equal but when a vehicle is being rapidly decelerated there is considerable transfer of weight from the rear to the front wheels so that if the braking effort applied to all four wheels is equal there is risk of the rear wheels becoming locked and causing the vehicle to skid.

One object of my invention is to provide simple and effective means whereby the braking effort applied through fluid pressure means to a wheel or set of wheels can be automatically limited to a predetermined value or whereby all the wheels of the vehicle can be braked equally up to a predetermined value after which no further braking effort is applied to one wheel or set of wheels while an increasing braking effort can be applied to the other wheel or set of wheels.

One of the features of my invention is an arrangement whereby fluid under pressure may be transmitted from a master cylinder to one or more brake cylinders through a piston or plunger which is axially movable in a cylinder forming part of the fluid transmission line, the plunger being held normally by the action of a preloaded spring so that liquid may flow through it but being so arranged that when the pressure on the piston or plunger exceeds the loading of the spring, the piston or plunger moves axially in the cylinder and closes the conduit leading to one or more brake cylinders so that no additional braking effort is applied by these cylinders however much the pressure applied to the piston in the master cylinder is increased. The device is arranged in the connections between the master cylinder and the brake cylinders at the wheel brakes of the vehicle so that it closes the connections to the brakes at some of the wheels whenever the pressure exceeds a predetermined amount. After the valve closes, further movement of the master cylinder piston forces fluid to the brake cylinders at the other wheels only. As shown, the device is in the main conduit from the master cylinder in such a manner that it forms in effect a forward extension of the master cylinder. As shown, two pipe lines are led from the device to the front and rear brake cylinders respectively and axial movement of the piston or plunger closes the outlet to the latter pipeline while leaving the former unobstructed. The practical details of construction of the device may vary considerably.

Figure 2:
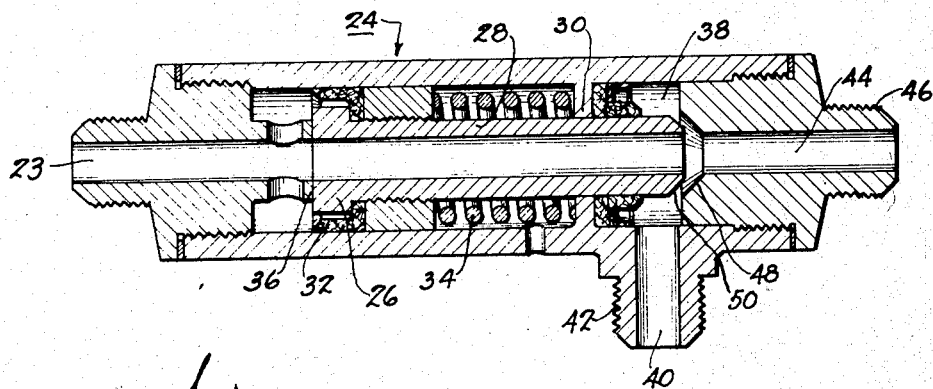

Further objects and features of the invention will be apparent after a reading of the subjoined specification and claims and after a consideration of the accompanying drawing in which:

Figure 1 is a diagrammatic view of a brake system including an embodiment of my invention; and Figure 2 is a view in section of the pressure limiting device included in the braking system.

As shown in Figure 1, my improved braking system may be applied to a vehicle having a chassis and road wheels 12. Each of the road wheels is provided with a brake 14 which is operated by a wheel cylinder 16 actuated by hydraulic pressure supplied thereto by conduits 18 and 20. The pressure in the conduits 18 and 20 is developed by a master cylinder 22 and as may be seen the conduits 18 lead to the front wheel brakes while the conduits 20 lead to the rear wheel brakes. Interposed in the conduits 20 is a pressure limiting device 24 which is shown more in detail in Figure 2.

In the convenient practical arrangement shown, the master cylinder 22 delivers fluid under pressure to one end 23 of the auxiliary cylinder 24, said end containing a piston 26 integral with a hollow piston rod 28 extending through a closure 30 at the other end of the cylinder. The piston is fitted with a cup-leather 32 and is urged towards the end of the cylinder through which fluid enters by a preloaded compression spring 34 of which the loading is preferably adjustable, the piston normally being held by the spring against a stop 36. The other end of the hollow piston rod, which is of smaller diameter than the piston, enters a chamber 38 having a lateral passage 40 leading into a union 42 adapted to receive a pipe-line 20 leading to the rear brake cylinders and an axial passage 44 in alignment with the piston rod leading into a union 46 adapted to receive a pipe-line 18 leading to the front brake cylinders.

The inner end of this latter passage 44 is coned as at 48 to form a valve seat and the adjacent end of the piston rod 28 is complementarily coned as at 50 but is normally spaced from the seat.

When pressure is applied to the fluid in the master cylinder 22 fluid is forced into the auxiliary cylinder 24 and passes through the hollow piston rod 28 into the chamber at the other end from which it passes into the pipe-lines 18 and 20 leading to both sets of brake cylinders, so that all the brakes are applied equally. At the same time the fluid is applying pressure to the piston 26 in the auxiliary cylinder and as the pressure applied to the fluid in the master cylinder 22 increases the thrust on the piston 26 increases until it exceeds the loading of the spring 34. The piston 26 and piston rod 28 then move axially against the action of the spring 34 and the coned end 50 of the piston rod 28 engages the seating 48 in the passage 44 leading to the front brake cylinders. Fluid can still pass through the piston rod 28 to the front brake cylinders but no further fluid can now pass to the rear brake cylinders so that no increased braking effort can be applied to the rear wheels. By substitution of a spring having a greater or lesser strength than the spring 34 the maximum braking effort which can be applied to the rear wheels can be varied as desired.

While this device is primarily designed for application to fluid pressure operated brakes, it can be employed for any analogous purpose where it is desired to limit the load applied by fluid pressure.

It is to be understood that the above-described embodiments of my invention are for the purpose of illustration only and various changes may be made therein without departing from the spirit and scope of the invention.

I claim:

1. A hydraulic brake system comprising a plurality of sets of brakes, fluid motors for each of said brakes, conduits leading to each of said sets of brakes, a pressure creating device connected to said conduits, and a pressure limiting device interposed in one of said conduits, said pressure limiting device comprising a cylindrical member having a connection leading to the master cylinder, a connection leading to one of said sets of brakes and a connection leading to the other set of brakes, and being provided with a piston acted on by the pressure developed in said system, a spring urging said piston in a direction opposed to that in which the pressure of the fluid urges the piston and arranged when held in its normal position by said spring to allow passage of fluid and pressure of fluid to both of said sets of brakes, but arranged when said spring is compressed by the pressure of the fluid to close off the connection to at least one of said sets of brakes.

2. In a fluid braking system for a vehicle including front braking means, rear braking means, a single pressure producing means, connecting means connecting said pressure producing means with said front and rear braking means, and a pressure limiting means in said connecting means between said pressure producing means and both of said braking means, said pressure limiting means including an initially opened valve permitting application of pressure to one of said braking means to a degree equal to the pressure applied to the other braking means, and means operable upon increase of pressure to a predetermined degree for moving said valve to closed position to thereby provide a differential pressure for each of said braking means, said pressure limiting means having a passage therethrough which is open at all times and which leads to said other braking means.

GLYN PIERCE ROBERTS.